United States Patent [19]
Nakamura et al.

[11] Patent Number: 5,347,962
[45] Date of Patent: Sep. 20, 1994

[54] VALVE MECHANISM OF INTERNAL COMBUSTION ENGINE

[75] Inventors: Makoto Nakamura; Shigeru Sakuragi; Hiroshi Komatsu, all of Yokosuka, Japan

[73] Assignee: Nissan Motor Co., Ltd., Yokohama, Japan

[21] Appl. No.: 903,336

[22] Filed: Jun. 24, 1992

[30] Foreign Application Priority Data

Jul. 1, 1991 [JP] Japan .................. 3-160652

[51] Int. Cl.$^5$ .............................................. F01L 1/34
[52] U.S. Cl. ..................... 123/90.16; 123/90.17
[58] Field of Search ............... 123/90.15, 90.16, 90.17, 123/90.27, 90.31

[56] References Cited

U.S. PATENT DOCUMENTS

| | | | |
|---|---|---|---|
| 4,768,475 | 9/1988 | Ikemura | 123/90.16 |
| 5,018,487 | 5/1991 | Shinkai | 123/90.16 |
| 5,031,583 | 7/1991 | Konno | 123/90.16 |
| 5,159,905 | 11/1992 | Sugiuchi et al. | 123/90.16 |
| 5,168,851 | 12/1992 | Itoyama et al. | 123/90.16 |

FOREIGN PATENT DOCUMENTS

| | | |
|---|---|---|
| 0276533 | 8/1988 | European Pat. Off. . |
| 63-167016 | 7/1988 | Japan . |
| 63-45521 | 11/1988 | Japan . |
| 4-17706 | 1/1992 | Japan . |
| 2120320A | 11/1983 | United Kingdom . |
| 2185784 | 7/1987 | United Kingdom . |
| 2199894 | 7/1988 | United Kingdom . |
| 2237326A | 5/1991 | United Kingdom . |

Primary Examiner—E. Rollins Cross
Assistant Examiner—W. Lo
Attorney, Agent, or Firm—Foley & Lardner

[57] ABSTRACT

A valve mechanism of an internal combustion engine is of a type which has at least two cams for each intake (or exhaust) valve. One cam is shaped to allow the associated engine to exhibit a marked fuel saving characteristic and the other cam is shaped to also the engine to produce a higher torque at relatively low (or high) engine speed. Upon a cam switching between these cams, at least one of the cams is subjected to a phase change before and/or after the actual cam switching. As a result, the undesired shock at the cam switching is eliminated or at least minimized.

24 Claims, 14 Drawing Sheets

VALVE MECHANISM OF INTERNAL COMBUSTION ENGINE

BACKGROUND OF THE INVENTION

1. Field of the Invention

The present invention relates in general to valve mechanisms of an internal combustion engine, and more particularly to valve mechanisms of a type which has a plurality of cams for each intake or exhaust valve, the cams being automatically switched in accordance with engine condition.

2. Description of the Prior Art

Hitherto, various valve mechanisms of an internal combustion engine have been proposed and put into practical use, some of which are disclosed for example in Japanese Laid Open Patent Applications 63-167016 and 4-17706, Japanese Laid Open Utility Model Application 63-45521, U.S. Pat. No. 4,768,475, European Laid Open Patent Application 0 276 533, UK Laid Open Patent Application 2 185 784 and UK Laid Open patent Application 2 199 894.

Japanese Laid Open Patent Application 63-167016 discloses a valve mechanism of the above-mentioned type in which two cams are employed for each intake (or exhaust) valve. The two cams have different cam profiles and they are automatically switched to change the valve timing in accordance with engine condition. As is known, in order to improve combustion in an entire operation range of engine condition, is preferable to vary the valve timing in accordance with the engine condition.

One of the two cams (which one will be referred to as the lower speed based cam hereinafter) is shaped to allow the engine to produce a higher torque at relatively low speed, while, the other cam (which will be referred to as the higher speed based cam hereinafter) is shaped to permit the engine to produce a higher torque at relatively high speed.

In addition to these two cams, the '016 publication proposes to use another cam (which will be referred to as the fuel consumption based cam hereinafter), which is shaped to allow the engine to exhibit a marked fuel saving characteristic in a partial load range.

In the valve mechanism disclosed in the '016 publication, a measure is employed in which the cam switching is carried out in such a manner as not to produce a marked difference in output power of the engine between before and after the cam switching. That is, in the disclosed mechanism, the cam switching is effected by selecting a certain engine speed at which the same throttle valve opening degree produces the same outputs of the engine before and after the cam switching.

However, due to its inherent construction, the valve mechanism of the '016 publication has a drawback in which, because the engine torque provided by the fuel consumption based cam is quite small relative to that provided by the low (or high) speed based cam, the cam switching therebetween produces a marked difference in engine torque even at the same throttle valve opening between before and after the cam switching.

As is mentioned hereinabove, in case of switching between the lower speed based cam and the higher speed based cam, the engine speed at which the same throttle valve opening degree produces the same outputs of the engine is used as an index for the switching.

However, in case of switching between the fuel consumption based cam and the low (or high) speed based cam, there is produced a big torque difference upon the cam switching. That is, when using the fuel consumption based cam, the lift of the intake valve is small and the valve closing takes place before the bottom dead center thereby causing the throttle opening to be enlarged for obtaining a needed output torque. Although this fact reduces a pumping loss and thus improves the fuel saving characteristic of the engine, the cam switching from the fuel consumption based cam to the low (or high) speed based cam, with the throttle opening degree kept unchanged, tends to produce a marked switching shock. In fact, upon switching to the low (or high) speed based cam, the engine torque is suddenly increased. In case of switching from the low (or high) speed based cam to the fuel consumption based cam, the engine torque is suddenly reduced. This sudden increase and reduction in torque brings about the marked switching shock.

The cam switching is carried out at will by a driver, that is, by depressing the accelerator pedal. That is, when, under engine operation using the fuel consumption based cam, the accelerator pedal is further depressed for obtaining an output torque beyond the torque actually provided by the fuel consumption based cam, either one of the low and high speed based cams is selected for the cam switching, considering the existing engine speed. Thus, for the reason as mentioned hereinabove, there is inevitably produced a marked shock upon the cam switching.

SUMMARY OF THE INVENTION

It is therefore an object of the present invention to provide a valve mechanism for an internal combustion engine, which is free of the above-mentioned drawbacks.

According to the present invention, there is provided an improved valve mechanism of an internal combustion engine, in which upon cam switching, the associated cams or one of them is subjected to a phase change before and/or after the actual cam switching. With this, the undesired shock at the cam switching is eliminated or at least minimized.

According to a first aspect of the present invention, there is provided a valve mechanism of an internal combustion engine, which mechanism comprises first and second cams which are shaped to allow the engine to produce lower and higher output torques respectively; switching means for switching the first and second cams in accordance with an operating condition of the engine; and phase changing means for changing the phase of at least one of the first and second cams before or after the cam switching made by the switching means.

According to a second aspect of the present invention, there is provided a valve mechanism of an internal combustion engine which comprises first and second cams which are shaped to allow the engine to produce lower and higher output torques respectively; judging means for judging the time when a cam switching between the first and second cams should be made in accordance with an operating condition of the engine; cam switching means for actually carrying out the cam switching based on an information produced by the judging means; and phase changing means for changing the phase of one of the first and second cams before the cam switching actually made by the cam switching means and changing the phase of the other of the first and second cams after the cam switching.

According to a third aspect of the present invention, there is provided a valve mechanism of an internal combustion engine which comprises first and second cams which are shaped to allow the engine to produce lower and higher output torques respectively; judging means for judging the time when a cam switching between the first and second cams should be made in accordance with an operating condition of the engine; cam switching means for actually carrying out the cam switching based on an information produced by the judging means; and phase changing means for changing the phase of one of the first and second cams before or after the cam switching actually made by the cam switching means.

DETAILED DESCRIPTION OF THE INVENTION

Figure 1:
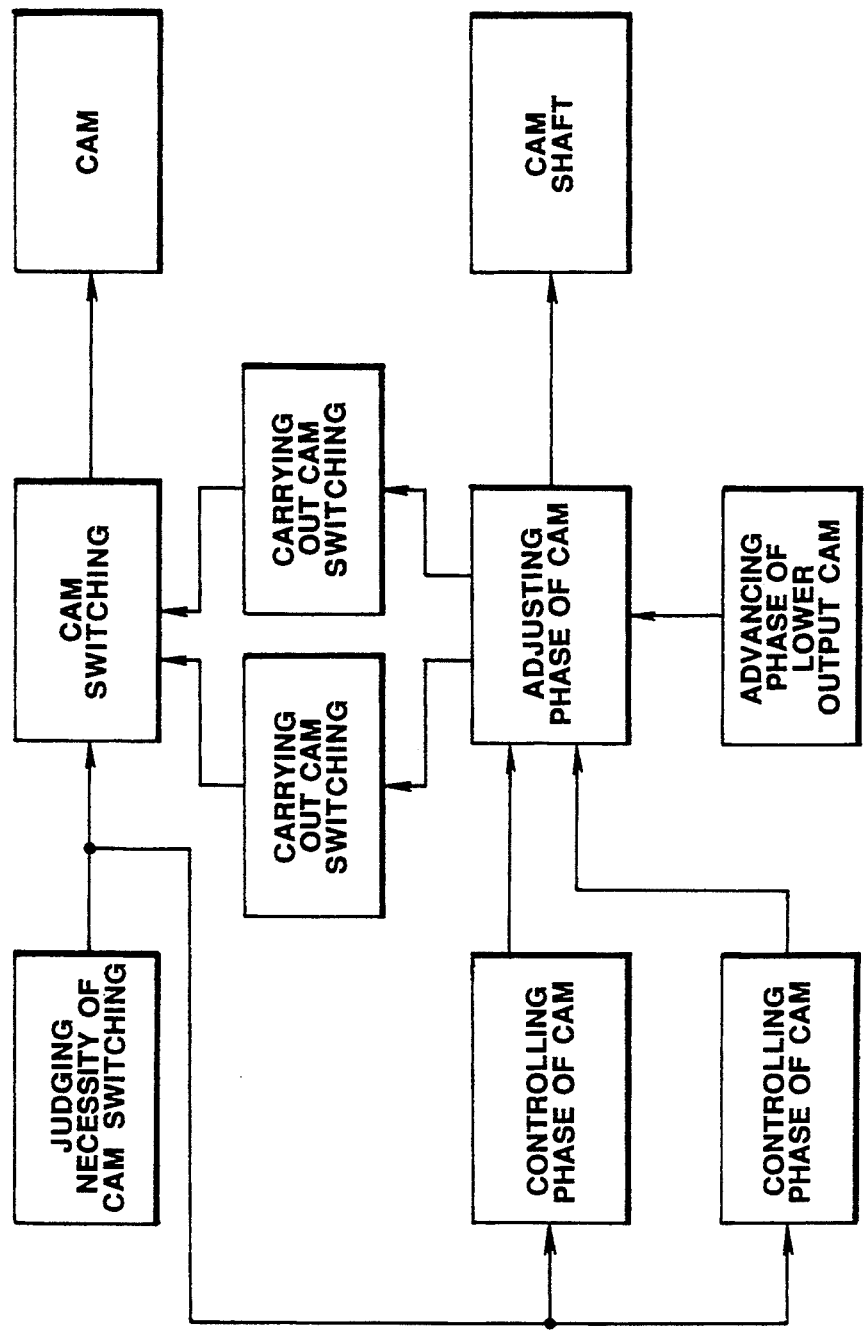
FIG. 1 is a conceptual view of the present invention.
Figure 2:
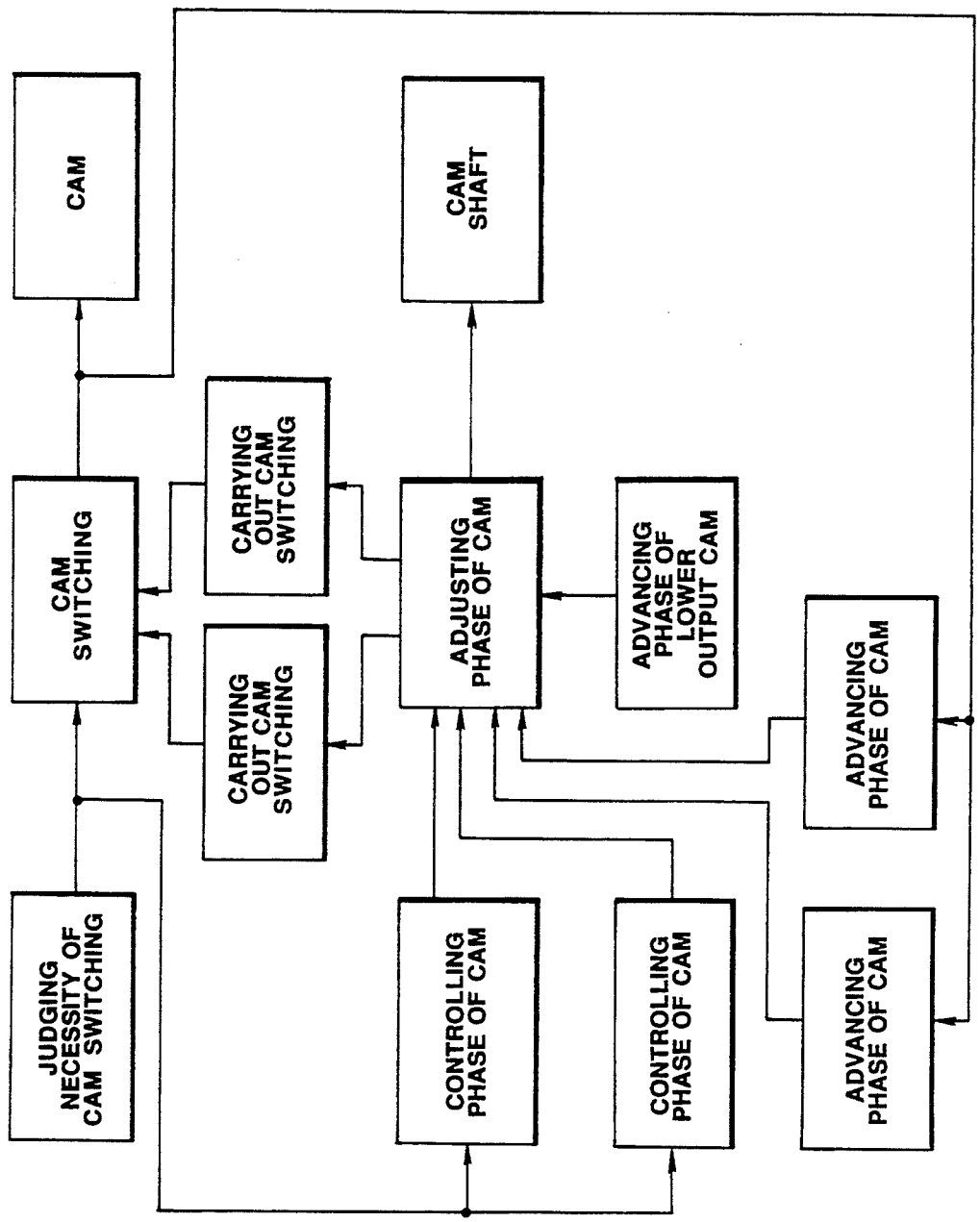
FIG. 2 is a conceptual view of a modification of the present invention.
Figure 3:
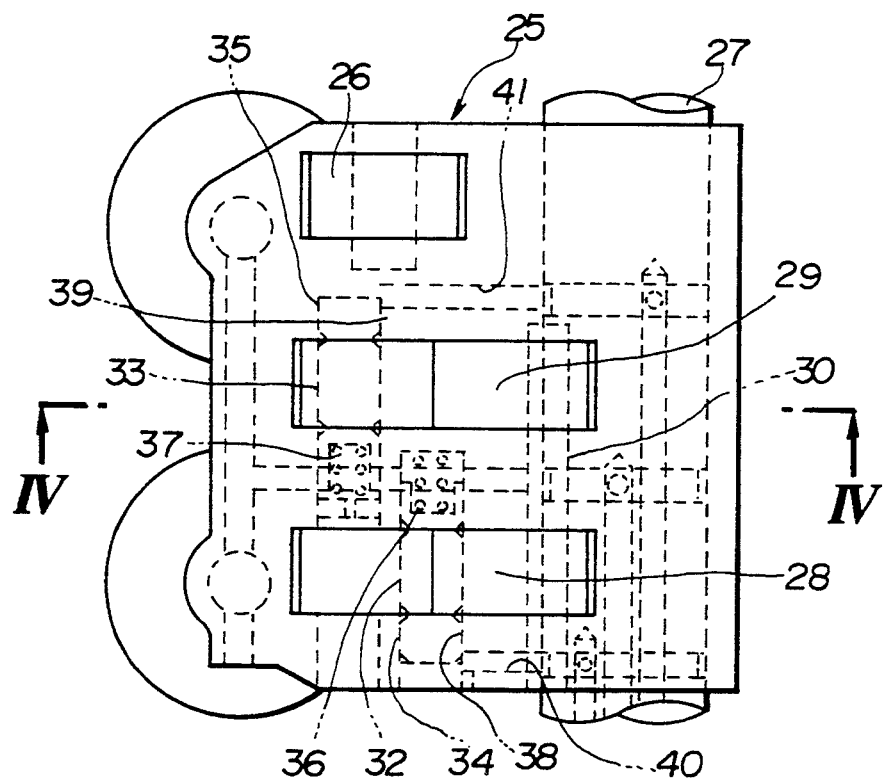
FIG. 3 is a plan view of a cam switching mechanism to which the present invention is practically applied, the view being taken from the direction of the line III—III of FIG. 4.
Figure 4:
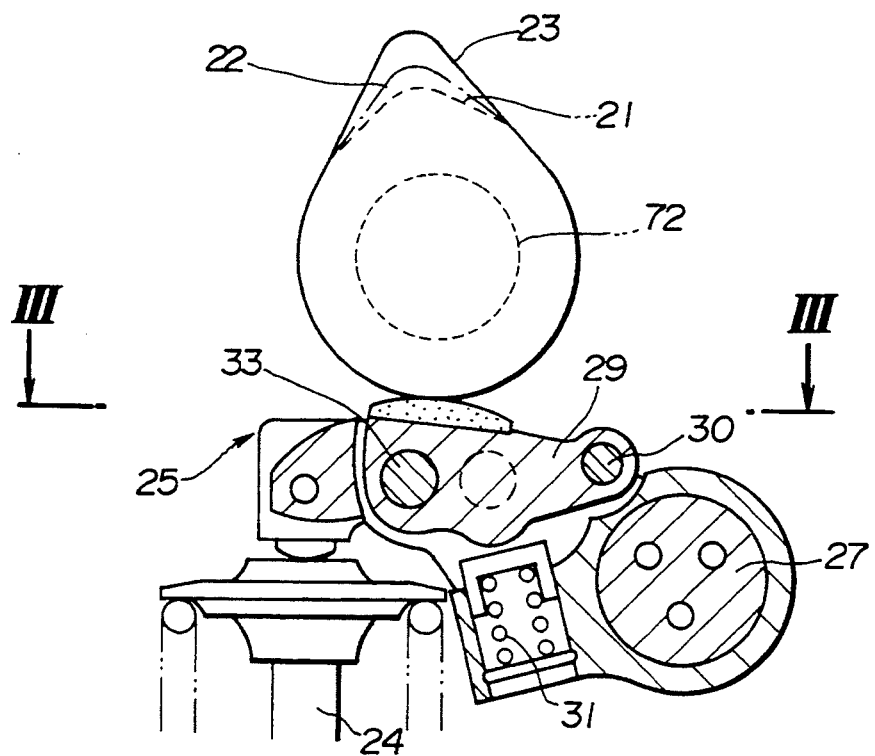
FIG. 4 is a sectional view taken along the line IV—IV of FIG. 3.

Referring to FIGS. 3 and 4, there is shown a cam switching mechanism to which the present invention is practically applied. The detail of this cam switching mechanism is disclosed in Japanese Laid Open Patent Application 4-17706.

As is seen in FIG. 4, designated by numeral 21 is a first cam or fuel consumption based cam, which has a cam profile shaped to allow an associated engine to exhibit a marked fuel consumption characteristic. That is, the cam lift is relatively small and the cam lift period is relatively short according to this first cam 21.

Designated by numeral 22 is a second cam or lower speed based cam, which has a cam profile shaped to allow the engine to produce a higher torque at relatively low engine speed. That is, according to this second cam 22, the cam lift is larger than that of the above-mentioned first cam 21.

Designated by numeral 23 is a third cam or higher speed based cam, which has a cam profile shaped to allow the engine to produce a higher torque at relatively high engine speed. That is, according to the third cam 23, the cam lift is larger than that of the second cam 22, and the cam lift period is longer than that of the second cam 22.

It is to be noted that the first, second and third cams 21, 22 and 23 are coaxially mounted on a common cam shaft 72, as is understood from FIG. 4.

As is seen from FIG. 4, designated by numeral 24 is a stem of an intake valve (or exhaust valve), and designated by numeral 25 is a main rocker arm which has a roller 26 (see FIG. 3) constantly pressed against the first cam 21. The main rocker arm 25 is pivotally moved to open and close the intake or exhaust valve 24, using a rocker shaft 27 as a fulcrum.

As will be understood from FIGS. 3 and 4, the main rocker arm 25 has two sub-rocker arms 28 and 29 pivotally mounted thereon through a common shaft 30. These two sub-rocker arms 28 and 29 are arranged in parallel with the roller 26 as shown. One sub-rocker arm 28 is contactable with the second cam 22, and the other sub-rocker arm 29 is contactable with the third cam 23.

When the two sub-rocker arms 28 and 29 are released or disengaged from the main rocker arm 25, they are urged to constantly contact with the second and third cams 22 and 23 by a lost-motion spring 31. Thus, under this release condition, the two sub-rocker arms 28 and 29 are operated independently of the main rocker arm 25.

In order to selectively lock the two sub-rocker arms 28 and 29 to the main rocker arm 25, the following arrangement is employed.

That is, the sub-rocker arm 28 has at its pivoted portion an axially slidable pin 32 and the main rocker arm 25 has another axially slidable pin 34 which is coaxial with the pin 32. Usually, the two pins 32 and 34 are biased by a return spring 36 to assume positions as shown in FIG. 3 wherein the sub-rocker arm 28 and the main rocker arm 25 are disengaged from each other. However, when an oil chamber 38 for actuating the pin 34 is fed with pressurized oil through a passage 40, the pins 32 and 34 are projected against the return spring 36 by given distances to effect a locked engagement of these two rocker arms 28 and 25. With this, the two rocker arms 28 and 25 operate like a single unit.

The lock engagement of the two rocker arms 28 and 25 takes place when they are kept in contact with the base circles of the first and second cams 21 and 22 respectively. Upon the locked engagement of the rocker arms 28 and 25, the intake (or exhaust) valve 24 is forced to operate with a valve timing provided by the second cam 22. As is described hereinabove, the valve lift provided by the second cam 22 is larger than that provided by the first cam 21. That is, upon the locked engagement, a switching is carried out from an engine operation based on the fuel consumption saving to an engine operation based on the higher output torque at a lower speed range.

A similar construction is applied to the other sub-rocker arm 29. That is, when an oil chamber 39 (see FIG. 3) is fed with the pressurized oil through a passage 41, two pins 35 and 33 are projected against the force of a return spring 37 to effect locked engagement of the sub-rocker arm 29 and the main rocker arm 25. With this, the two rocker arms 29 and 25 operate like a single unit. Upon the locked engagement, the intake (or exhaust) valve 24 is forced to operate with a valve timing provided by the third cam 23 whose valve lift and valve lift period are larger and longer than those of the first cam 21. That is, upon the locked engagement, a switching is carried out from an engine operation based on the fuel consumption saving to an engine operation based on the higher output at a higher speed range.

Figure 7:
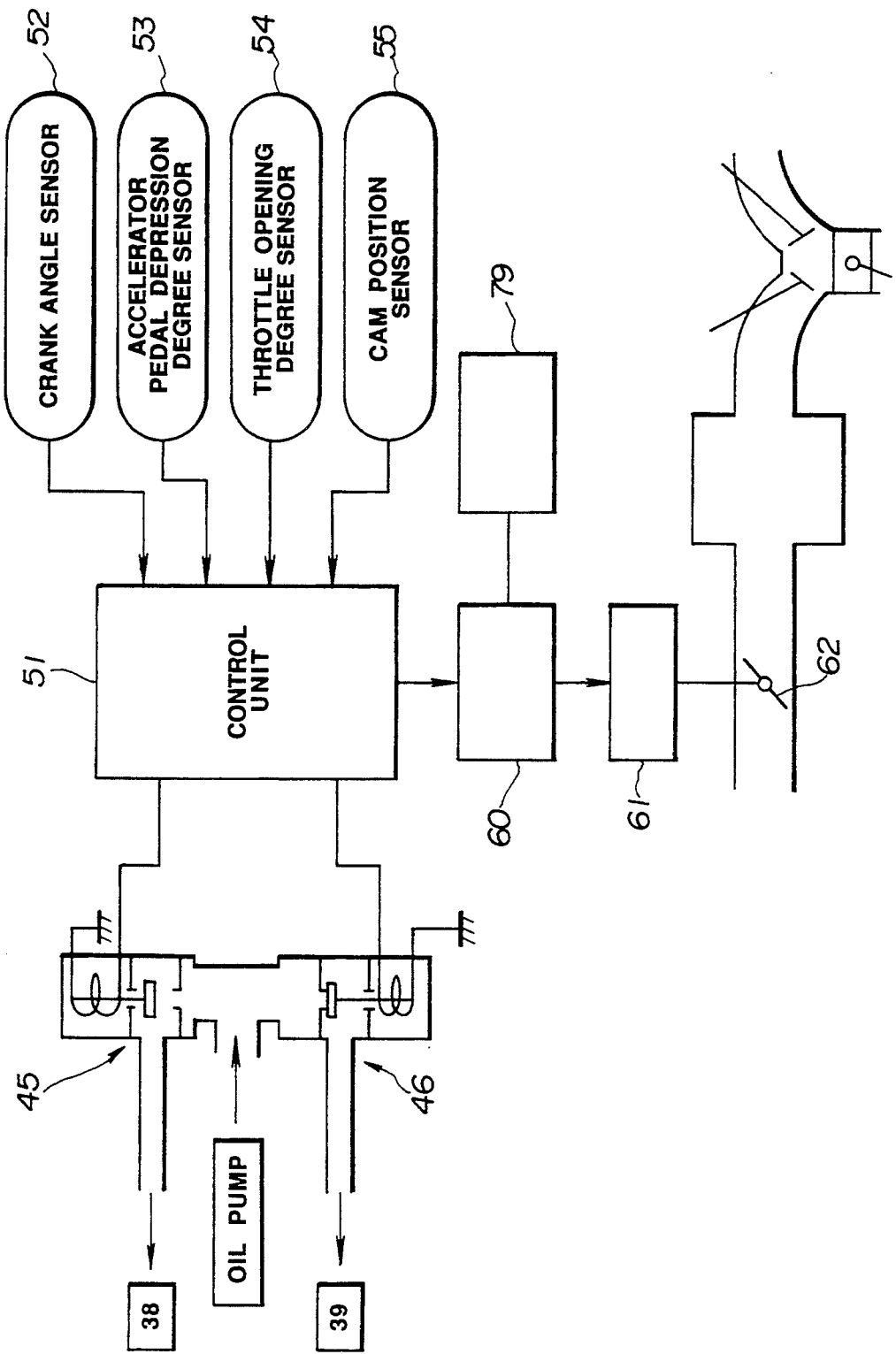
FIG. 7 is a block diagram of a control system employed in the invention.

In order to control the cam switching from the first cam 21 to either one of the second and third cams 22 and 23 and a reversed switching from either one of the second and third cams 22 and 23 to the first cam 21, there is employed a control unit 51 which is schematically shown in FIG. 7. As will become apparent as the description proceeds, the cam selection is made in accordance with the engine condition.

That is, the control unit 51 controls the valve mechanism in such a manner that when the needed output torque and the rotation speed of the engine are within ranges which can be provided by the first cam 21, the first cam 21 is selected, and when thereafter, due to further depression of the accelerator pedal to increase the throttle opening, the needed output torque of the engine comes up to a range provided by the second cam 22, the second cam 22 is selected, and thereafter when the engine speed comes up to a range provided by the third cam 23, the third cam 23 is selected.

In order to achieve such operation, various information signals are fed to the control unit 51, which are signals issued by a crank angle sensor 52, an accelerator pedal depression degree sensor 53, a throttle opening degree sensor 54 and a cam position sensor 55. The crank angle sensor 52 issues a signal representing engine speed and crank angle, the accelerator pedal depression degree sensor 53 issues a signal representing the depression degree of an accelerator pedal, the throttle opening degree sensor 54 issues a signal representing the opening degree of a throttle valve and the cam position sensor 55 issues a signal representing the position of the selected cam 21, 22 or 23.

By treating the information signals from these sensors, the control unit 51 determines the time when the cam switching should be effected and determines the cam 21, 22 or 23 which should be used next. In accordance with this determination, the control unit 51 controls two electromagnetic valves 45 and 46 by which oil feeding to the oil chambers 38 and 39 is controlled an in ON/OFF manner.

That is, when the valve 45 is opened, pressurized oil from an oil pump is fed to the oil chamber 38 to make the second cam 22 operative. While, when the other valve 46 is opened, the pressurized oil is fed to the other oil chamber 39 to make the third cam 23 operative.

Figure 5:
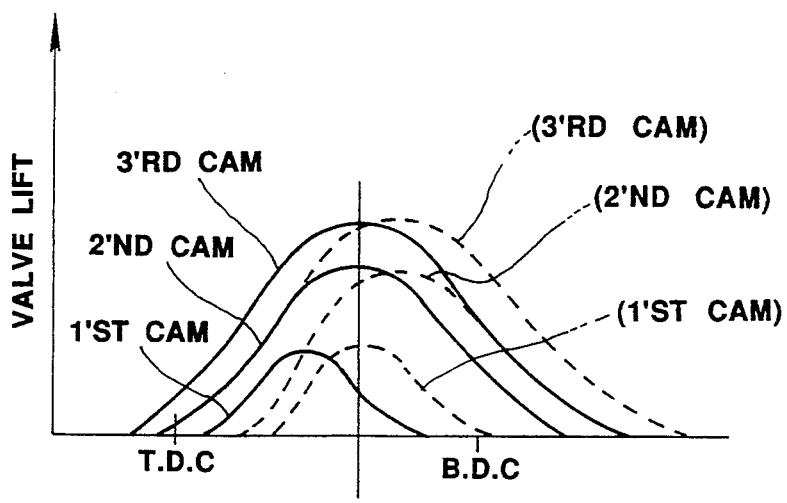
FIG. 5 is a graph showing the lift characteristics of various cams.

FIG. 5 shows the valve lift characteristics of the first, second and third cams 21, 22 and 23. As is seen from the characteristic curves illustrated by solid lines, the phase of the first cam 21 is somewhat advanced as compared with those of the second and third cams 22 and 23, so that when using the first cam 21, the intake valve 24 closes long before the bottom dead center. Although, under this engine operation, the output torque is lowered, the pumping loss is reduced and thus the fuel saving characteristic is much improved in comparison with a case in which the phase is normally set.

Figure 6:
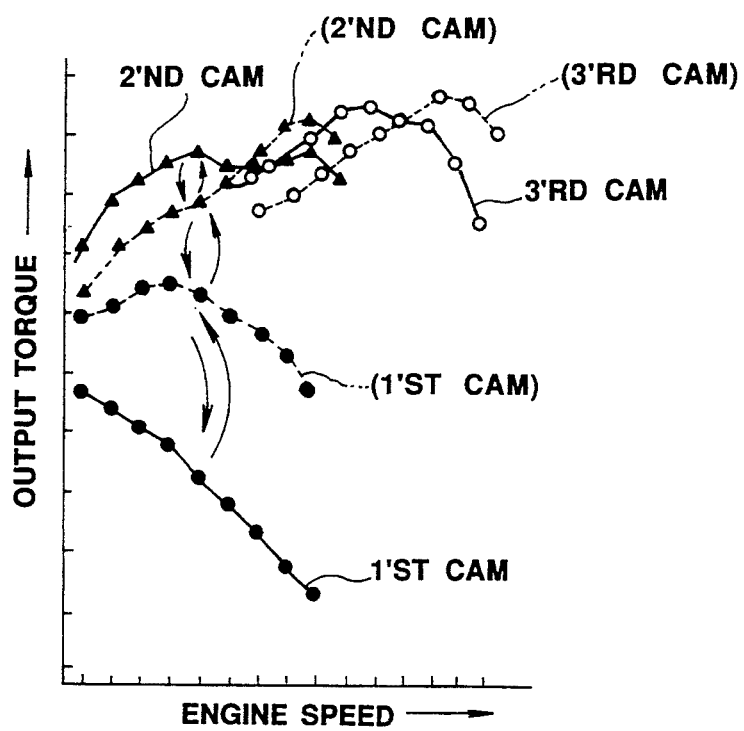
FIG. 6 is a graph showing the full throttle output characteristics provided by the cams and the order in which the cams are switched.

FIG. 6 shows the full throttle output torque characteristics provided by the first, second and third cams 21, 22 and 23. As is seen from the characteristic curves illustrated by solid lines, in case of using the first cam 21, the output torque is relatively low but the fuel consumption is improved. In case of using the second cam 22, the maximum torque at the lower speed range is the highest. While, in case of using the third cam 23, the output torque at the lower speed range is lower than that of the second cam 22, but the maximum torque at the higher speed range is the highest.

As has been described hereinabove, hitherto, the above-mentioned difference in output torque provided between the first, second and third cams 21, 22 and 23 has caused the undesired switching shock at the cam switching. In fact, such switching shock has lowered the operability of the engine and caused undesired vibration of the vehicle body. In fact, by changing the cams 21, 22 and 23, the mixture charging efficiency of each cylinder of the engine, which has a direct effect on the engine output torque, is forced to change.

Upon a requirement of cam switching, the throttle opening degree is corrected in such a manner that the output torques provided by the two cams are substantially equalized between before and after the cam switching. This is because the opening degree of the throttle valve 62 (see FIG. 7) necessary for providing a needed output torque varies depending on the cam then selected.

The control unit 51 thus controls, through a drive circuit 60 and an actuator 61, the opening degree of the throttle valve 62 independently of the accelerator pedal. That is, upon a requirement of cam switching, the control unit 51 corrects the opening degree of the throttle valve 62 by treating the information signals from the crank angle sensor 52 and the accelerator pedal depression degree sensor 53, so that there is substantially no difference in output torque between before and after the cam switching. The opening degree of the throttle valve 62 is fed back to the control unit 51.

However, even in the above-mentioned operation, there is a limitation in absorbing the undesired switch shock.

In accordance with the present invention, the following measure is employed for eliminating the switching shock or at least minimizing the same. For ease of description, the difference in output torque between before and after the cam switching will be referred to as "torque gap".

That is, in the present invention, during cam switching, at least one of the associated cams is subjected to a phase change for achieving a shockless cam switching.

As is seen from the graphs of FIGS. 5 and 6, when the phase of the cam 21, 22 or 23 changes, output torque provided by the cam is changed. That is, in case of the first cam 21, the basic phase is advanced by a given degree for reducing the pumping loss. When the phase is returned or delayed to a normal position wherein, as is shown by the dotted curved (see FIG. 5), the maximum valve lift appears at a middle point between the upper and bottom dead centers, the output torque provided by the first cam 21 is increased as is seen from the dotted curve for the first cam in FIG. 6. While, when the phase of the second cam 22 (or third cam 23) is delayed relative to its normal position as shown by the dotted curve in FIG. 5, the output torque provided by the cam 22 or 23 is lowered as is seen from the dotted curved for the second cam in FIG. 6.

Accordingly, by changing the phases of the cams 21, 22 and 23, each cam can have two output characteristics provided by the engine. Thus, if the cam switching is carried out between similar output characteristics provided by the two cams, the undesired torque gap can be minimized. That is, for example, for achieving a cam switching from the first cam 21 to the second cam 22, a so-called "three step cam switching" is available which induces a smoothed cam switching.

Figure 8:
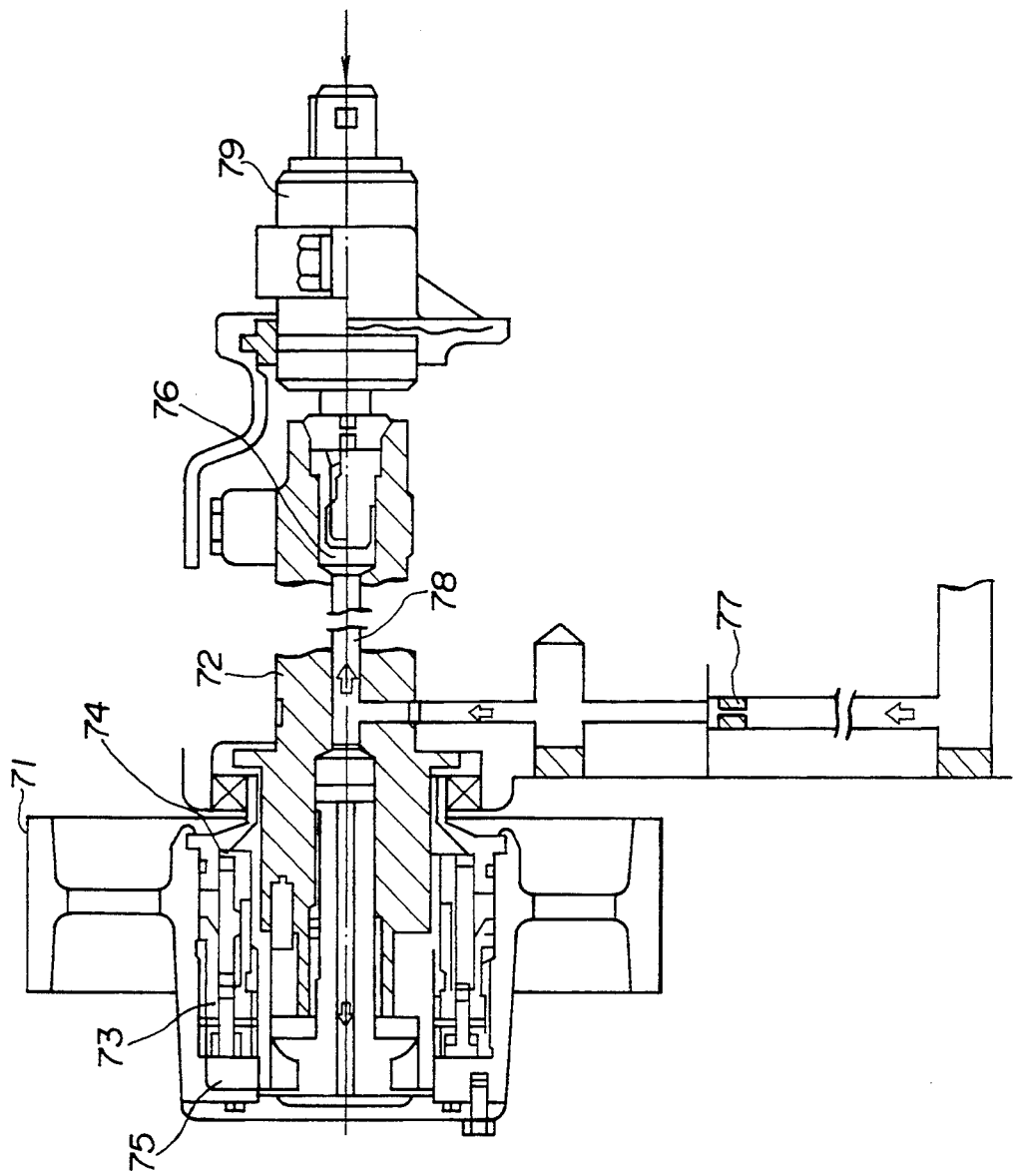
FIG. 8 is a sectional view of a cam phase controlling mechanism employed in the invention.

FIG. 8 shows a mechanism for changing the phases of the cams 21, 22 and 23. Designated by numeral 71 is a pulley which is driven by the engine through a belt (not shown). Within a hollow hub portion of the pulley 71, there is axially movably inserted an end portion of the cam shaft 72. Between the pulley 71 and the cam shaft 72 in the hollow hub portion, there is axially disposed a piston 73 which has, on its outer and inner cylindrical surfaces, helical splines engaged with the pulley 71 and the cam shaft 72. A spring 74 is arranged to bias the piston 73 toward its original position. Designated by numeral 75 is an oil chamber. Thus, when the oil chamber 75 is fed with pressurized oil, the piston 73 is moved against the biasing force of the spring 74 thereby to change the angular position of the cam shaft 72 relative to the pulley 71. Designated by numeral 76 is a control valve which controls the hydraulic pressure fed to the oil chamber 75 The control valve 76 is installed in a passage 78 which is branched from a main oil passage in which pressurized oil from a cylinder block main gallery flows in the direction of the arrows. The main oil passage has an orifice 77 installed therein. Thus, when the control valve 76 closes the passage 78, the oil pressure fed to the oil chamber 75 is increased. The control valve 76 is actuated by a solenoid actuator 79 which is controlled by the control unit 51 (see FIG. 7) through the drive circuit 60. Thus, the phases of the cams 21, 22 and 23, which are determined by the angular position of the cam shaft 72 relative to the pulley 71, are controlled by the control unit 51.

Figure 9:
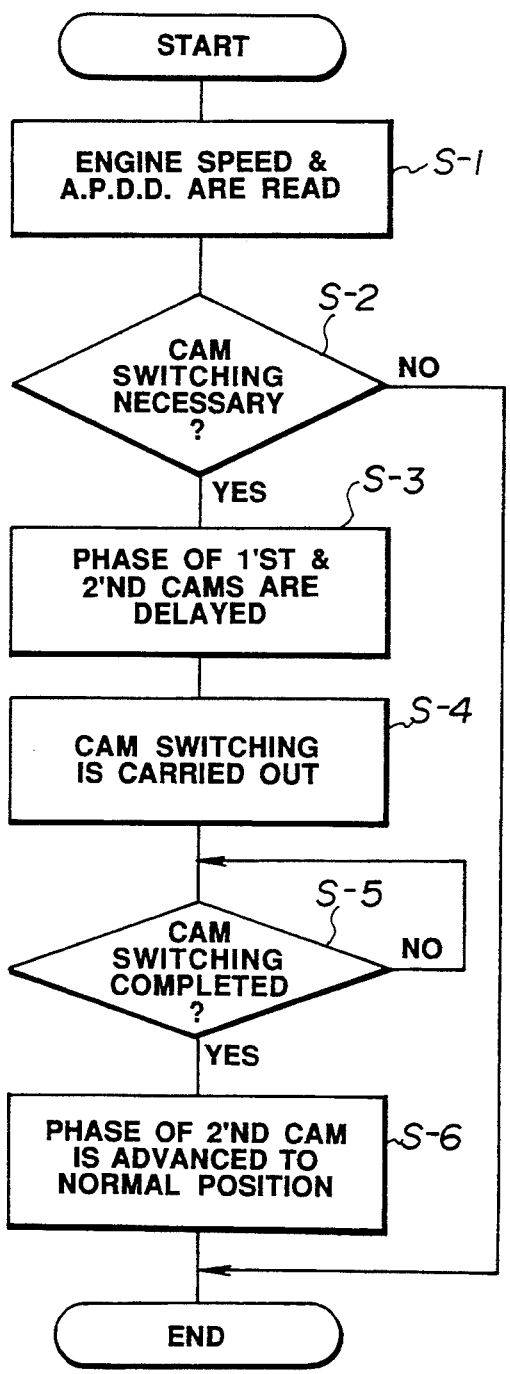
FIG. 9 is a flowchart of one embodiment, showing programmed operation steps for achieving a cam switching from a lower output cam to a higher output cam.

FIG. 9 is a flowchart which shows programmed operation steps which are taken in a first embodiment of the present invention for achieving a cam switching from the first cam 21 to the second cam 22.

At step S-1, the engine speed and the accelerator pedal depression degree are read, and then at step S-2, a judgement is carried out as to whether the cam switching from the first cam 21 to the second cam 22 should be made or not. If YES, that is, when necessity of the cam switching is judged, the operation goes to step S-3. Upon this, the angular position of the cam shaft 72 relative to the pulley 71 is changed so that the previously advanced phase of the operating first cam 21 is returned (or delayed) to the normal position (which is illustrated by the dotted curve in FIG. 5) and at the same time, the phase of the idling second cam 22 is delayed to its normal position. Due to the phase shifting of the first cam 21, as is shown by the dotted curve for the first cam in FIG. 6, the output torque provided by the first cam 21 is increased to a range approaching the output torque which can be provided by the second cam 2. Then, the operation goes to step S-4 at which the cam switching from the first cam 21 to the second cam 22 is actually carried out. Because the phase of the second cam 22 has been delayed which causes a reduced output torque (as shown by the dotted curve for the second cam in FIG. 6), the torque gap at the cam switching is very small and thus the cam switching from the first cam 21 to the second cam 22 is smoothly carried out. Now, the engine operates using the second cam 22 in the delayed phase.

Then, the operation goes to step S-5 at which completion of the cam switching is checked. If YES, that is, when the cam switching is completed, the operation goes to step S-6 at which the angular position of the cam shaft 72 relative to the pulley 71 is returned to the original position returning or advancing the phase of the second cam 22 to its normal position. Thus, thereafter, the output torque provided by the second cam 22 is increased to the level shown by the solid curve in FIG. 6.

As will be understood from the above description, substantially "three" torque changing steps are used for achieving the cam switching from the first cam 21 to the second cam 22, which reduces the undesired switching shock. In the conventional valve mechanism, only one torque changing step is employed for such cam switching, which has caused a marked switching shock.

Similar operation steps are used in case of a reversed cam switching from the second cam 22 to the third cam 23.

Figure 10:
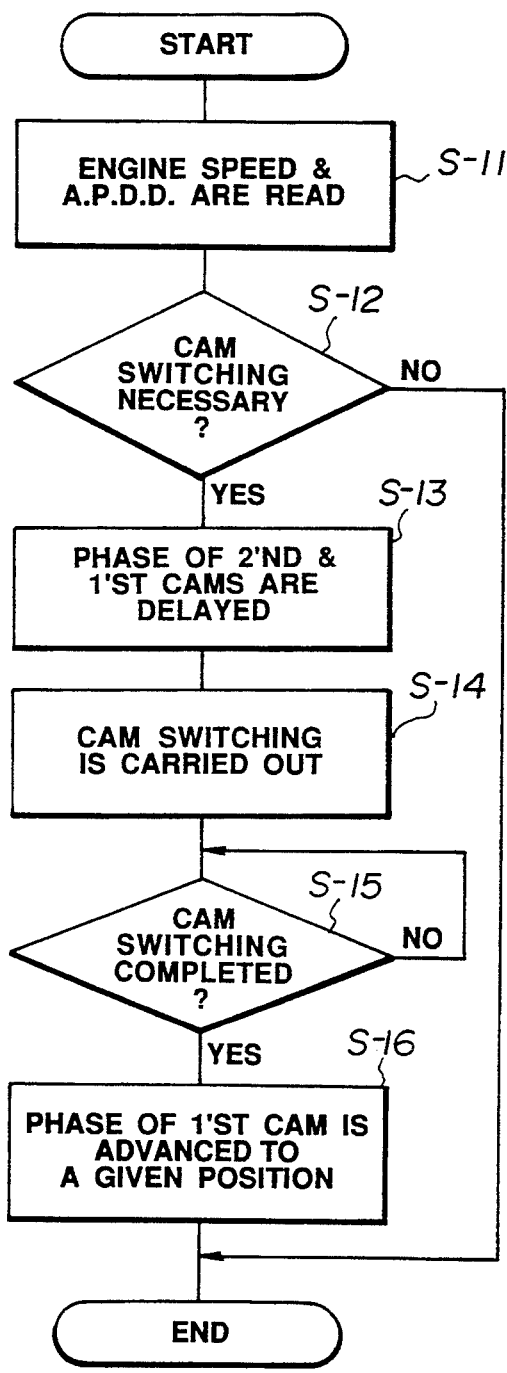
FIG. 10 is a flowchart of said one embodiment, showing programmed operation steps for achieving a cam switching from the higher output cam to the lower output cam.

FIG. 10 is a flowchart which shows programmed operation steps which are taken in the first embodiment for achieving a cam switching from the second cam 22 to the first cam 21.

At step S-11, the engine speed and the accelerator pedal depression degree are read, and then at step S-12, a judgement is carried out as to whether the cam switching from the second cam 22 to the first cam 21 should be made or not. If YES, that is, when necessity of the cam switching is judged, the operation goes to step S-13. Upon this, the angular position of the cam shaft 72 relative to the pulley 71 is changed so that the phase of the operating second cam 22 is delayed and at the same time the previously advanced phase of the idling first cam 21 is returned to the normal position. Due to the phase shifting of the second cam 22, the output torque provided by the second cam 22 is lowered to a range approaching the output torque which can be provided by the first cam 21. Then, the operation goes to step S-14 at which the cam switching from the second cam 22 to the first cam 21 is actually carried out. Because the phase of the first cam 21 has been returned to the normal position causing an increased output torque provided thereby, the torque gap at the cam switching is small and thus the cam switching from the second cam 22 to the first cam 21 is smoothly carried out. Now, the engine operates using the first cam 21 in the normally positioned phase.

Then, the operation goes to step S-15 at which the completion of the cam switching is checked. If YES, the operation goes to step S-16 at which the angular position of the cam shaft 72 relative to the pulley 71 is returned to the original position advancing the phase of the first cam 21. Thus, thereafter, the output torque provided by the first cam 21 is reduced. However, the engine operation under this condition exhibits an improved fuel saving characteristic.

As will be understood from the above description, substantially "three" torque changing steps are used for achieving the cam switching from the second cam 22 to the first cam 21, which reduces the undesired switching shock.

Figure 11:
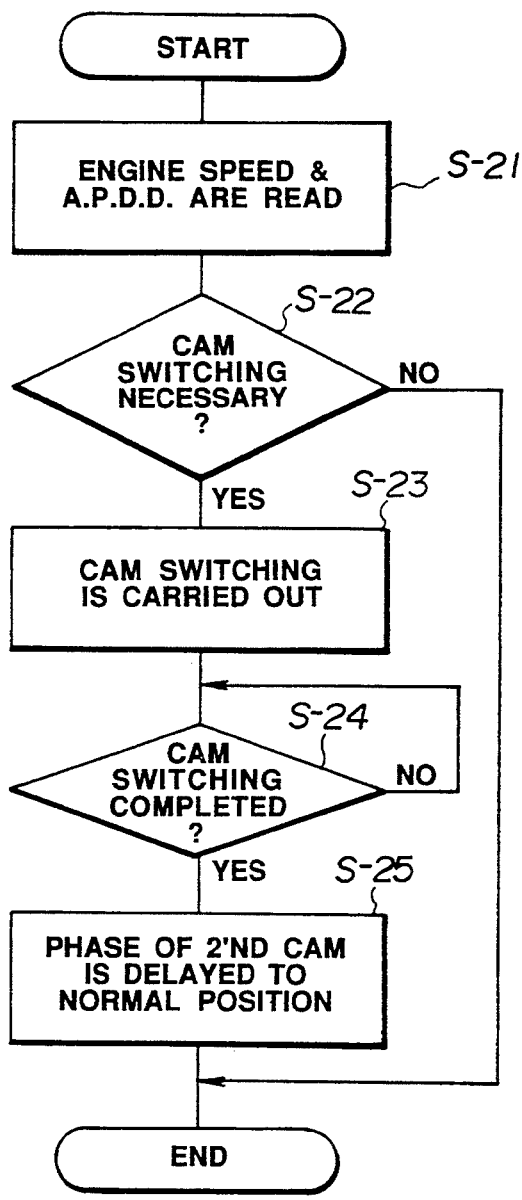
FIG. 11 is a flowchart of another embodiment, showing programmed operation steps for achieving a cam switching from a lower output cam to a higher output cam.
Figure 12:
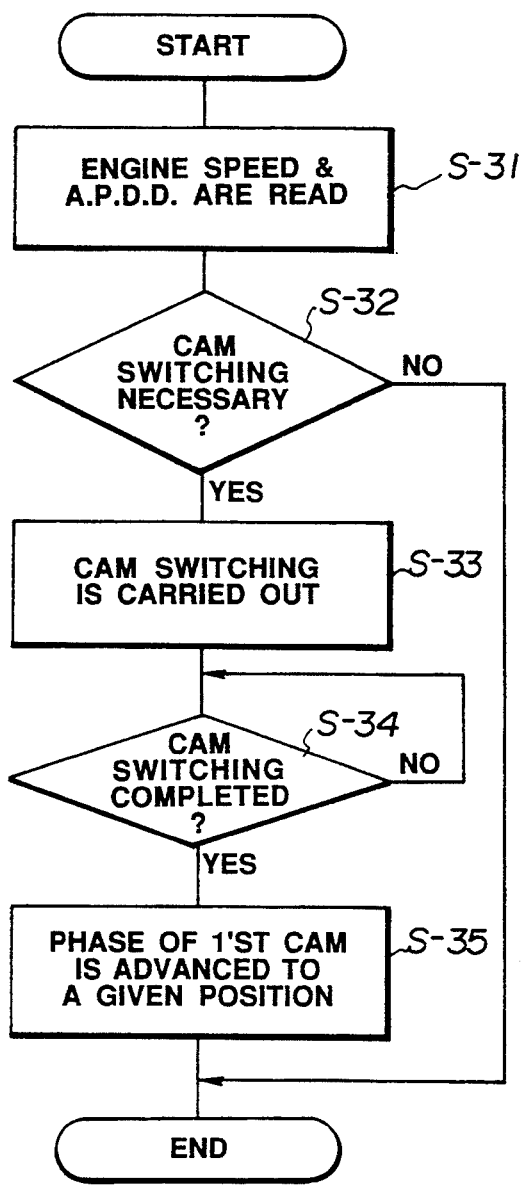
FIG. 12 is a flowchart of said another embodiment, showing programmed operation steps for achieving a cam switching from the higher output cam to the lower output cam.

FIGS. 11 and 12 are flowcharts showing programmed operation steps which are taken in a second embodiment of the present invention. As will become apparent as the description proceeds, in this second embodiment, substantially "two" torque changing steps are used for achieving a cam switching.

Figure 13:
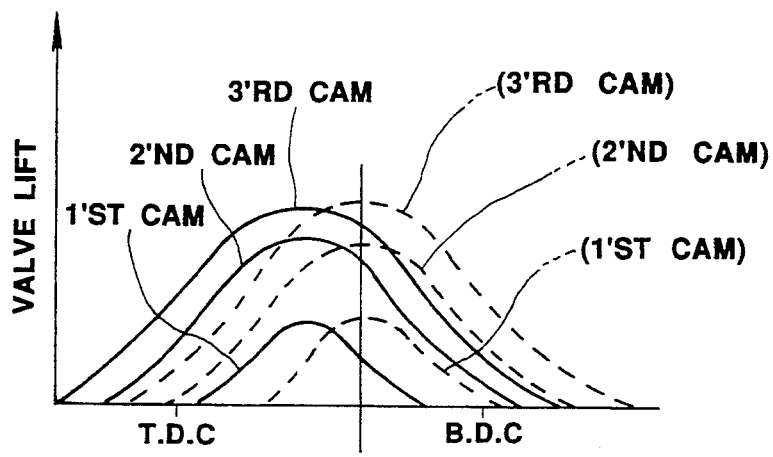
FIG. 13 is a graph showing the lift characteristics of various cams employed in said another embodiment.

As will be understood from FIG. 13, in this second embodiment, there is no phase difference between the first, second and third cams 21, 22 and 23, but the original phases of them are set at positions advanced from normal positions by a given degree.

FIG. 11 shows the programmed operation steps taken for achieving a cam switching from the first cam 21 to the second cam 22.

At step S-21, the engine speed and the accelerator pedal depression degree are read, and then at step S-22, a judgement is carried out as to whether the cam switching from the first cam 21 to the second cam 22 should be made or not. If YES, the operation goes to step S-23 at which the cam switching from the first cam 21 to the second cam 22 is actually carried out. Because the original phase of the second cam 22 has been advanced together with the first cam 21 as is described hereinabove, the output torque provided by the second cam 22 is smaller than that provided when the cam 22 is in the normal phase position. Thus, such cam switching is smoothly carried out. Now, the engine operates using the second cam 22 in the advanced phase.

Figure 14:
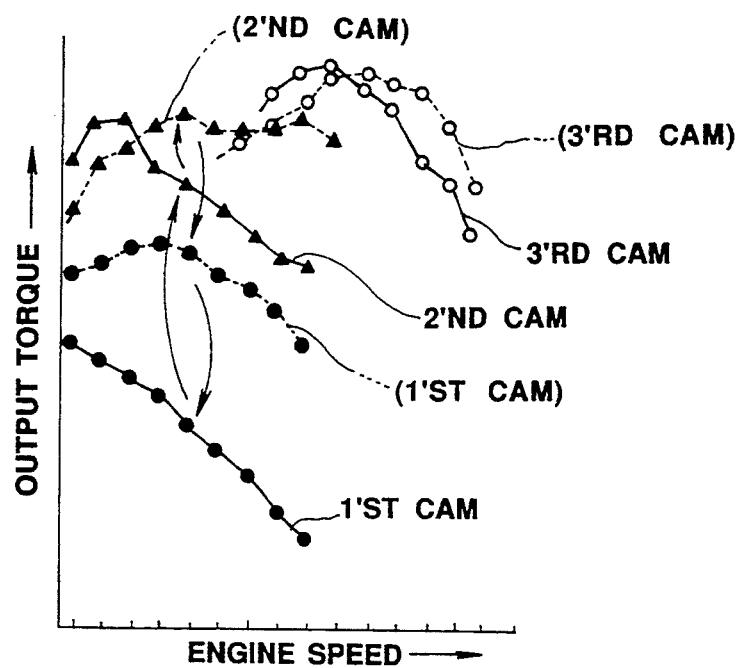
FIG. 14 is a graph showing the full throttle output characteristics provided by the cams employed in said another embodiment and the order in which the cams are switched.

Then, the operation goes to step S-24 at which completion of the cam switching is checked. If YES, the operation goes to step S-25 at which the angular position of the cam shaft 72 relative to the pulley 71 is changed to delay the phase of the second cam 22 to its normal position. Thus, thereafter, the output torque provided by the second cam 22 is increased to the level shown by the dotted curve for the second cam in FIG. 14.

Thus, in achieving the cam switching from the first cam 21 to the second cam 22, substantially "two" torque changing steps are used, which reduces the undesired switching shock, as compared to a case where the cam switching is directly made from the first cam 21 in the advanced phase to the second cam 22 in the normal phase.

FIG. 12 shows the programmed operation steps taken for achieving the cam switching from the second cam 22 to the first cam 21.

At step S-31, the engine speed and the accelerator pedal depression degree are read, and then at step S-32, a judgement is carried out as to whether the cam switching from the second cam 22 to the first cam 21 should be made or not. If YES, the operation goes to step S-33. Upon this, the cam switching from the second cam 22 to the first cam 21 is actually carried out. Because the phases of the second and first cams 22 and 21 have been both set at the normal positions as is seen from the dotted curves for the second and first cams in FIG. 13, the torque gap at the cam switching is relatively small. Thus, such cam switching is smoothly carried out. Now, the engine operates using the first cam 21 in the delayed (or normal) phase.

Then, the operation goes to step S-34 at which completion of the cam switching is checked. If YES, the operation goes to step S-35 at which the angular position of the cam shaft 72 relative to the pulley 71 is changed to advance the phase of the first cam 21 to the advanced position.

In this case, substantially "two" torque changing steps are used for the cam switching, which reduces the undesired switching shock.

Figure 15:
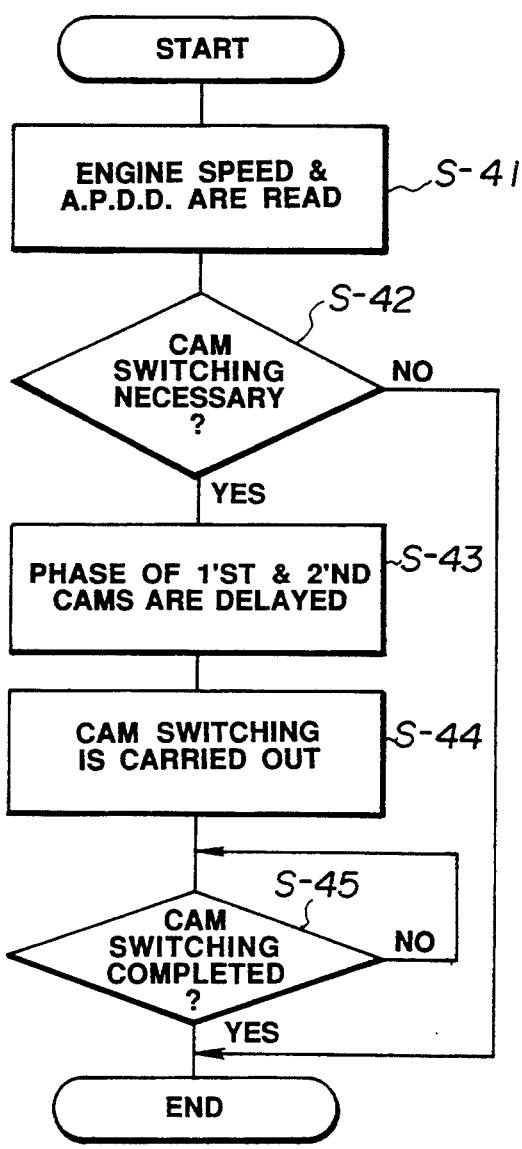
FIG. 15 is a flowchart of still another embodiment, showing programmed operation steps for achieving a cam switching from a lower output cam to a higher output cam.
Figure 16:
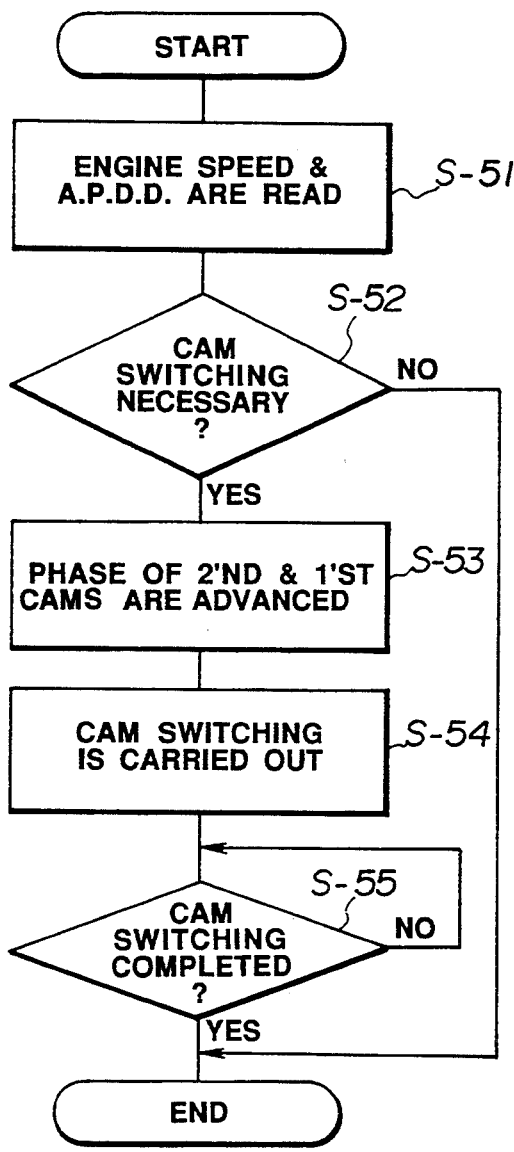
FIG. 16 is a flowchart of said still another embodiment, showing programmed operation steps for achieving a cam switching from the higher output cam to the lower output cam.

FIGS. 15 and 16 are flowcharts showing programmed operation steps which are taken in a third embodiment of the present invention. In this third embodiment, substantially "two" torque changing steps are also used for achieving a cam switching.

In this third embodiment, the setting of the phases of the first, second and third cams 21, 22 and 23 is the same as that of the above-mentioned second embodiment (see FIG. 13). That is, there is no phase difference between the first, second and third cams 21, 22 and 23, but their original phases are set at positions advanced from normal positions by a given degree.

FIG. 15 shows the programmed operation steps taken for achieving a cam switching from the first cam 21 to the second cam 22.

Figure 17:
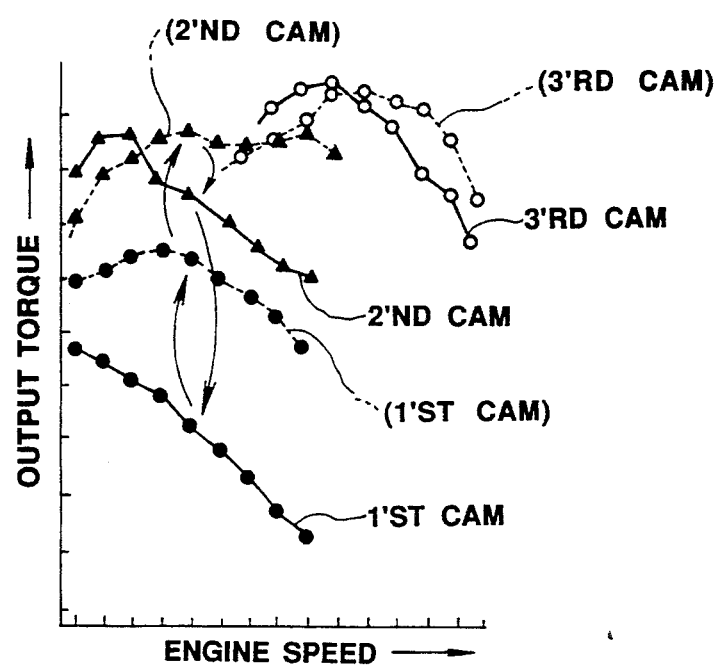
FIG. 17 is a graph showing the full throttle output characteristics provided by various cams employed in said still another embodiment and the order in which the cams are switched.

At step S-41, the engine speed and the accelerator pedal depression degree are read, and at step S-42, a judgement is carried out as to whether the cam switching from the first cam 21 to the second cam 22 should be made or not. If YES, the operation goes to step S-43. Upon this, the angular position of the cam shaft 72 relative to the pulley 71 is changed so that the phase of the operating first cam 21 is delayed to its normal position and at the same time, the phase of the idling second cam 22 is also delayed to its normal position. Thus, the output torque provided by the first cam 21 is increased and the output torque which will be provided by the second cam 22 is also increased. It is to be noted that as is seen from the graph of FIG. 17, the difference (viz., torque gap) between these two torques is relatively small.

Then, the operation goes to step S-44 at which the cam switching from the first cam 21 to the second cam 22 is actually carried out. Because the torque gap is small, the cam switching is smoothly carried out. Thus, thereafter, the engine operates using the second cam 22 in the delayed (or normal) phase.

Then, the operation goes to step S-45 at which completion of the cam switching is checked.

In this case, substantially two torque changing steps are used, which reduces the undesired switching shock.

FIG. 16 shows the programmed operation steps taken for achieving a cam switching from the second cam 22 to the first cam 21. It is to be noted that under operation of the engine with the second cam 22 in operation, the first and second cams 21 and 22 are both in the delayed (or normal phase).

At step S-51, the engine speed and the accelerator pedal depression degree are read, and at step S-52, a judgement is carried out as to whether the cam switching from the second cam 22 to the first cam 21 should be made or not. If YES, the operation goes to step S-53 at which the angular position of the cam shaft 72 relative to the pulley 71 is changed so that the phase of the operating second cam 22 is advanced and at the same time the phase of the idling first cam 21 is also advanced.

Then, the operation goes to step S-54 at which the cam switching from the second cam 22 to the first cam 21 is actually carried out. Because the phase of the second cam 22 has been advanced, the output torque provided by the second cam 22 is reduced as is seen from FIG. 13. Thus, thereafter, the engine operates using the first cam 21 in the advanced phase.

Also in this case, substantially two torque changing steps are used, which reduces the undesired switching shock, as compared to a case where the cam switching is directly made from the second cam 22 in the normal phase to the first cam 21 in the advanced phase.

As is described hereinabove, for achieving a smoothed cam switching between the first cam and the second (or third) cam, three torque changing steps are used in the first embodiment and two torque changing steps are used in the second and third embodiments.

What is claimed is:

1. A valve mechanism of an internal combustion engine comprising:
    first and second cams which are shaped to allow the engine to produce lower and higher output torques respectively;
    switching means for switching between the first and second cams in accordance with an operating condition of the engine; and
    phase changing means for changing the phase of at least one of said first and second cams one of just before and just after the cam switching is made by said switching means.

2. A valve mechanism as claimed in claim 1, in which said phase changing means comprises:
    a cam shaft on which said first and second cams are coaxially and securely mounted;
    a pulley driven by said engine and coaxially connected to said cam shaft to drive the same; and
    angular position changing means for changing an angular position of said cam shaft relative to said pulley.

3. A valve mechanism of an internal combustion engine comprising:
    first and second cams which are shaped to allow the engine to produce lower and higher output torques respectively;
    judging means for judging the time when a cam switching between said first and second cams should be made in accordance with an operating condition of the engine;
    cam switching means for actually carrying out the cam switching based on an information produced by said judging means; and
    phase changing means for changing the phase of one of said first and second cams before the cam switching actually made by said cam switching means and changing the phase of the other of said first and second cams after said cam switching.

4. A valve mechanism as claimed in claim 3, in which said phase changing means comprises:
    a cam shaft on which said first and second cams are coaxially and securely mounted;
    a pulley driven by said engine and coaxially connected to said cam shaft to drive the same;
    an angular position changing means for changing an angular position of said cam shaft relative to said pulley and thus changing the phases of said first and second cams; and
    control means for controlling said angular position changing means in accordance with information signals fed thereto.

5. A valve mechanism as claimed in claim 4, in which said control means operates in such a manner that upon a requirement of a cam switching from said first cam to said second cam, said first cam is subjected to a phase change from an advanced position to a normal position before the actual cam switching, and said second cam is subjected to a phase change from a delayed position to a normal position after the actual cam switching.

6. A valve mechanism as claimed in claim 5, in which the phase change of said first cam is carried out while said first cam is in operative condition and said second cam is in idling condition, and in which said phase change of said second cam is carried out while said second cam is in operative condition and said first cam is in idling condition.

7. A valve mechanism as claimed in claim 4, in which said control means operates in such a manner that upon a requirement of a cam switching from said second cam to said first cam, said second cam is subjected to a phase change from a normal position to a delayed position before the actual cam switching, and said first cam is subjected to a phase change from a normal position to an advanced position after the actual cam switching.

8. A valve mechanism as claimed in claim 7, in which the phase change of said second cam is carried out while said second cam is in operative condition and said first cam is in idling condition, and in which the phase change of said first cam is carried out while said first cam is in operative condition and said second cam is in idling condition.

9. A valve mechanism of an internal combustion engine comprising:
    first and second cams which are shaped to allow the engine to produce lower and higher output torques respectively;
    judging means for judging the time when a cam switching between said first and second cams should be made in accordance with an operating condition of the engine;
    cam switching means for actually carrying out the cam switching based on an information produced by said judging means; and
    phase changing means for changing the phase of one of said first and second cams one of just before and just after the cam switching is actually made by said cam switching means.

10. A valve mechanism as claimed in claim 9, in which said phase changing means comprises:
    a cam shaft on which said first and second cams are coaxially and securely mounted;
    a pulley driven by said engine and coaxially connected to said cam shaft to drive the same;
    an angular position changing means for changing an angular position of said cam shaft relative to said pulley and thus changing the phases of said first and second cams; and
    control means for controlling said angular position changing means in accordance with information signals fed thereto.

11. A valve mechanism as claimed in claim 10, in which said control means operates in such a manner that upon a requirement of a cam switching from said first cam to said second cam, said second cam is subjected to a phase change from an advanced position to a normal position just after the actual cam switching.

12. A valve mechanism as claimed in claim 11, in which the phase change of said second cam is carried out while said second cam is in operative condition and said first cam is in idling condition.

13. A valve mechanism as claimed in claim 2, in which the cam switching is actually carried out while said first and second cams are being operated in advanced phases.

14. A valve mechanism as claimed in claim 10, in which said control means operates in such a manner that upon a requirement of a cam switching from said second cam to said first cam, said first cam is subjected to a phase change from a normal position just to an advanced position after the actual cam switching.

15. A valve mechanism as claimed in claim 14, in which the phase change of said first cam is carried out while said first cam is in operative condition and said second cam is in idling condition.

16. A valve mechanism as claimed in claim 15, in which the cam switching is actually carried out while said second and first cams are being operated in normally positioned phases.

17. A valve mechanism as claimed in claim 10, in which said control means operates in such a manner that upon a requirement of a cam switching from said first cam to said second cam, said first cam is subjected to a phase change from an advanced position just to a normal position before the actual cam switching.

18. A valve mechanism as claimed in claim 17, in which the phase change of said first cam is carried out while said first cam is in operative condition and said second cam is in idling condition.

19. A valve mechanism as claimed in claim 18, in which the cam switching is actually carried out while said first and second cams are being operated in normally positioned phases.

20. A valve mechanism as claimed in claim 10, in which said control means operates in such a manner that upon a requirement of a cam switching from said second cam to said first cam, said second cam is subjected to a phase change from a normal position to an advanced position just before the actual cam switching.

21. A valve mechanism as claimed in claim 20, in which the phase change of said second cam is carried out while said second cam is in operative condition and said first cam is in idling condition.

22. A valve mechanism as claimed in claim 21, in which the cam switching is actually carried out while said second and first cams are being operated in advanced phases.

23. A valve mechanism as claimed in claim 2, in which said angular position changing means comprises:

means defining a cylindrical bore in said pulley, said bore spacedly receiving therein a cylindrical end of said cam shaft thereby to defining an annular space therebetween;

an annular piston coaxially disposed in said annular space;

a hydraulic actuator for axially moving said annular piston in said annular space; and means for establishing a helical engagement between said piston and an inner surface of said cylindrical bore and between said piston and said cylindrical end, so that when said annular piston is axially moved by said hydraulic actuator, said pulley and said cam shaft are forced to rotate about a common axis in opposite directions thereby varying the angular position of said cam shaft relative to said pulley.

24. A valve mechanism as claimed in claim 4, in which said angular position changing means comprises:

means defining a cylindrical bore in said pulley, said bore spacedly receiving therein a cylindrical end of said cam shaft thereby defining an annular space therebetween;

an annular piston coaxially disposed in said annular space;

a hydraulic actuator for axially moving said annular piston in said annular space; and means for establishing a helical engagement between said piston and an inner surface of said cylindrical bore and between said piston and said cylindrical end, so that when said annular piston is axially moved by said hydraulic actuator, said pulley and said cam shaft are forced to rotate about a common axis in opposite directions thereby varying the angular position of said cam shaft relative to said pulley.

* * * * *